(12) United States Patent  (10) Patent No.: US 8,529,855 B2
Chew  (45) Date of Patent: Sep. 10, 2013

(54) METHODS AND SYSTEM FOR REMOVING GAS COMPONENTS FROM FLUE GAS

(75) Inventor: Hwee Hong Chew, Singapore (SG)

(73) Assignee: Ecospec Global Technology Pte Ltd., Singapore (SG)

( * ) Notice: Subject to any disclaimer, the term of this patent is extended or adjusted under 35 U.S.C. 154(b) by 0 days.

(21) Appl. No.: 13/583,582

(22) PCT Filed: May 26, 2010

(86) PCT No.: PCT/CN2010/073259
§ 371 (c)(1),
(2), (4) Date: Sep. 7, 2012

(87) PCT Pub. No.: WO2011/147085
PCT Pub. Date: Dec. 1, 2011

(65) Prior Publication Data
US 2013/0052111 A1    Feb. 28, 2013

(51) Int. Cl.
*B01D 53/50* (2006.01)
*B01D 53/56* (2006.01)
*B01D 53/62* (2006.01)
*B01D 53/74* (2006.01)
*B01D 53/75* (2006.01)

(52) U.S. Cl.
USPC . 423/220; 423/235; 423/243.01; 423/243.04; 423/351; 423/445 R; 423/567.1; 423/DIG. 10; 422/168; 422/169; 422/170; 422/186; 205/617; 205/615; 205/763; 204/164; 204/174; 204/177; 204/194; 204/232

(58) Field of Classification Search
USPC ......... 204/164, 174, 177, 194, 232; 205/617, 205/615, 763; 423/220, 235, 243.01, 243.04, 423/351, 445 R, 567.1, DIG. 10; 422/168–170, 422/186
See application file for complete search history.

(56) References Cited

U.S. PATENT DOCUMENTS

| 5,490,973 | A  | * | 2/1996  | Grothaus et al. | 422/186.04 |
| 6,962,679 | B2 | * | 11/2005 | Josephson et al. | 423/241 |
| 7,067,204 | B2 | * | 6/2006  | Nomura et al. | 428/698 |
| 7,438,869 | B1 | * | 10/2008 | Fabian et al. | 422/186.03 |
| 2001/0001435 | A1 | * | 5/2001 | Palekar et al. | 204/164 |

FOREIGN PATENT DOCUMENTS

| CN | 1628892 A   |   | 6/2005 |
| JP | 63182023 A  |   | 7/1988 |
| JP | 4-219123 A  | * | 8/1992 |
| JP | 6165909 A   |   | 6/1994 |

(Continued)

OTHER PUBLICATIONS

Bai, Xiyao et al. Decomposition of Poisonous Gases SO2 and NOx with Plasma Technique at Low Temperature and Normal Pressure. Environmental Science. Feb. 1993, vol. 14, No. 1, pp. 37-39.

*Primary Examiner* — Timothy Vanoy
(74) *Attorney, Agent, or Firm* — Wendy K. Marsh

(57) ABSTRACT

A method for removing gas components $SO_x$, $NO_x$, and $CO_2$ from a flue gas, comprises the steps of contacting the flue gas successively with first, second and third liquid mediums each of which provides a plasma containing reactive electrons or ions in an amount such that the gas molecules $SO_x$, $NO_x$, and $CO_2$ are successively subjected to impingement of the electrons or ions in the respective plasma to enable the dissociation of the gas molecules $SO_x$, $NO_x$, and $CO_2$ so as to remove $SO_x$, $NO_x$, and $CO_2$ from the flue gas. A system for removing gas components $SO_x$, $NO_x$, and $CO_2$ from a flue gas is also disclosed.

38 Claims, 4 Drawing Sheets

(56) References Cited

FOREIGN PATENT DOCUMENTS

| JP | 6-285330 A | * | 10/1994 |
| JP | 6343820 A | | 12/1994 |
| WO | WO2008102708 A1 | | 8/2008 |
| WO | WO2009025003 A2 | | 2/2009 |

* cited by examiner

METHODS AND SYSTEM FOR REMOVING GAS COMPONENTS FROM FLUE GAS

FIELD OF THE INVENTION

The present invention relates to a method and a system for removing pollutants and greenhouse gases, and more particularly, to a method and a system for simultaneously removing gas components such as $SO_x$, $NO_x$, and $CO_2$ from a flue gas using electron impingement in a wet plasma environment.

BACKGROUND OF THE INVENTION

With the increasing awareness of the negative impact of pollutants and greenhouse gases particularly the gas components $SO_x$, $NO_x$ and $CO_2$ on the environment, many emission control legislations are now in place to control the emission of these pollutants and Greenhouse gases. Numerous attempts have been made to meet the requirement of these legislations, among which one way is to go for post combustion gas abatement technology. However, this technology is not satisfactory due to the complex nature of the flue gases. It has been known that the composition of the flue gases differ greatly and depends on the type of the fuel used. However $SO_x$, $NO_x$ and $CO_2$ are three main common gases produced simultaneously in the combustion process. Hence, it is impractical to consider abatement of one single gas only while ignoring the conflicting influence from other gases.

Most of the technologies available in the art are directed to removal of a single gas, which will be described below.

$SO_2$ is usually removed by wet or dry lime scrubbing process. This is either a liquid or solid phase chemical reaction process for removing $SO_2$ only but not for removing $NO_x$. In fact, production of the lime CaO would lead to emission of $CO_2$, when the raw material $CaCO_3$ is heated to obtain the CaO. Lime is used as a consumable reactant in the process.

$SO_2$ can also be removed by seawater or freshwater scrubbing with or without the addition of NaOH. In this process, the $SO_2$ is removed by liquid phase chemical reaction with the concurrent generation of environmentally harmful acidic water or $CO_2$. Alkalinity in the water or the added NaOH is used as consumable reactant in the process. Again, this process is not capable of removing $NO_x$ or $CO_2$.

$NO_x$ is commonly removed by a Selective Catalytic Reduction (SCR) process. In the SCR process, urea or ammonia is used to reduce the $NO_x$ into nitrogen and oxygen. The SCR process is capable of removing the $NO_x$ only but cannot remove $SO_x$ or $CO_2$. In fact, $SO_x$ will "poison" the catalyst in the SCR process. Another disadvantage of the SCR process is that high temperature over 300° C. is required for catalyzing the gas reduction. This is impractical in the post combustion systems of many combustion plants, especially when installation of waste heat recovery is needed to recover residual heat from the exhaust gas. In the SCR system, a liquid phase chemical reaction which utilizes high thermal energy to perform the catalytic gas reduction takes place.

$NO_x$ can also be removed by chemical oxidation processes, in which $NO_x$ is forced to react with oxidizing agent such as ozone and acids to convert NO to $NO_2$ and eventually to $N_2O_5$ before it is dissolved in the water to form nitrate or nitrite. This process may cause an environmental issue because of the formation of the high content of nitrate or nitrite in the discharge water. This process is not capable of removing $CO_2$ and $SO_x$.

Generally, $CO_2$ in the flue gas is hundreds times higher than $SO_x$ or $NO_x$ in volumetric composition. There is no suitable or viable technology available in the art to remove $CO_2$. One approach to deal with $CO_2$ is the so-called Carbon Capture and Storage (CCS) method which utilizes chemicals, for example monoethanolamine (MEA), to capture the $CO_2$ and release it back for storage by heating. This method is to underground store the $CO_2$ instead of letting it going into the atmosphere.

In general, the available technologies in the art for the abatement of $SO_x$, $NO_x$ and $CO_2$ gases in a large scale are involved with the use of chemicals and are implemented via liquid phase reactions.

An electro-chemical process is proposed to produce sodium hydroxide for removal of the pollutant gases (*Sukheon An and Osami Nishida, JSME International Journal, series B*, vol 46, No 1, 2003). Essentially, the process is using the electrolyzed seawater to produce the chemical NaOH to perform the liquid phase neutralization and thus to remove the gases $SO_x$ and $CO_2$. The acid water produced at the anode side is then used to oxidize the $NO_x$ into nitrate via liquid phase chemical reactions. As discussed in this article, the entire process is working on the principle of liquid phase chemical reactions. $SO_2$ is converted into sodium sulfate in liquid phase reaction, $NO_x$ is converted into sodium nitrate in liquid phase, and $CO_2$ is converted into bicarbonates and carbonates in liquid phase. This process has a discharge issue of nitrate and requires a mole equivalent weight of NaOH to carry out the liquid phase reaction in order to remove each gram of $CO_2$. This will inevitably involve an immense amount of NaOH or a large amount of electricity to electrolytically produce the NaOH. An accompanying problem of using this process is that the amount of $CO_2$ generated during the electrolysis process is likely more than the amount of $CO_2$ that is needed to be removed from the flue gases. In addition, the nitrate resulting from the removal of the $NO_x$ and the wash water produced in this process will cause an environmental problem unless an extensive waste water treatment plant is separately installed to treat the waste water. If the process is implemented in a closed loop system, the system will reach a saturation point where no further liquid phase reaction takes place when the limited amount of reactants in the seawater or freshwater is used up for conversion of $CO_2$, $SO_x$ and $NO_x$. This limitation makes it impractical to use such a process in closed loop applications. This process may find an application in an open loop system only, since the supply of seawater reactant is continuous. However, the issues of the produced nitrate, waste water and the problem of the energy required to remove the $CO_2$ remains unresolved.

All the above methods are based on liquid phase reactions. Presently, there are various methods and systems which use a dry plasma technique to remove the gas $NO_x$. The common feature of these methods and systems is to use a reaction chamber with high voltage to create the plasma. The generation of the plasma normally requires a clean environment which is practically impossible to achieve in coal or fuel combustion flue gas systems. In the dry plasma-based methods, electron streams are generated by high voltage and high power to bombard the gas molecule $NO_x$ so that $NO_x$ is broken into $N_2$ and $O_2$, as discussed in U.S. Pat. Nos. 7,240,484, 7,377,101, 7,198,764, 7,188,469.

The drawbacks of using the dry plasma-based methods and systems are that a clean environment is required and that high voltage and high energy are consumed. Especially, the energy consumed for the removal of $CO_2$ will be very high. This results in limited applications of the dry plasma-based methods and systems in a large scale, especially when the abatement of all the gases $SO_x$, $NO_x$ and $CO_2$ is necessary.

As can be seen, the pollutants and greenhouse gases $SO_2$, $NO_x$ and $CO_2$ are all produced and mixed together in the flue gas, and all are needed to be removed before the flue gas is emitted. However, the above processes and systems are either intended for removing one of the pollutants and greenhouse gases, or are not a practical solution. If all these gases are to be removed together by the respective processes, installation of three different treatment plants will be necessary for the removal of all three gases. This inevitably results in high capital cost, large storage space, and high cost of reagents, in additional to the issues of storage and disposal of final products.

There is a need for a method and a system that are capable of simultaneously removing the pollutants and greenhouse gases from a flue gas at low cost, and do not cause a harm to the atmosphere and marine environments without the need of consideration of disposal of final products and storage of raw reagents.

SUMMARY OF THE INVENTION

The present invention has been developed to fulfill the needs noted above and therefore has a principle object of the provision of a method and a system for simultaneously removing the gas components from a flue gas, which is environmentally friendly.

Another object of the invention is to provide a method and a system for simultaneously removing the gas components from a flue gas which is significantly more economical and energy-efficient.

A yet further object of the invention is to provide a method and a system for simultaneously removing the gas components from a flue gas, which utilizes easily obtainable raw materials in a relatively less amount, and the materials can be recycled after the treatment of the flue gas.

These and other objects and advantages of the invention are satisfied by providing a method for removing gas components $SO_x$, $NO_x$, and $CO_2$ from a flue gas, comprising the steps of:

a) contacting the flue gas with a first liquid medium which provides a first plasma containing reactive electrons or ions in an amount such that the gas molecules $SO_x$ are subject to impingement of the electrons or ions in the first plasma to enable the dissociation of the gas molecules $SO_x$ so as to remove $SO_2$ from the flue gas;

b) contacting the flue gas obtained from step a) with a second liquid medium which provides a second plasma containing reactive electrons or ions in an amount such that the gas molecules $CO_2$ are subject to impingement of the electrons or ions in the second plasma to enable the dissociation of the gas molecules $CO_2$ so as to remove $CO_2$ from the flue gas; and c) contacting the flue gas obtained from step b) with a third liquid medium which provides a third plasma containing reactive electrons or ions in an amount such that the gas molecules $NO_x$ are subject to impingement of the electrons or ions in the second plasma to enable the dissociation of the gas molecules $NO_x$ so as to remove $NO_x$ from the flue gas.

If necessary, steps a) to c) of the method may be repeated for one or more times.

According to the invention, the first, second and third liquid media have pH value substantially equal to or close to their respective ionization constant (pKa).

In one embodiment of the invention, the first medium is fresh water saturated with carbonates, sulphates, phosphates or any combination thereof at a pH ranging from 9 to 11, the second medium is fresh water or sea water saturated with carbonates, sulphates, phosphates or any combination thereof at a pH ranging from 9 to 11, and the third medium is fresh water or sea water saturated with carbonates, sulphates, phosphates or any combination thereof at a pH ranging from 10 to 12.

Sulfuric acid solution may be used as the first medium in some cases where there is a sudden surge in the gas $SO_2$ load, and the pH of the sulfuric acid solution is controlled to range from 2 to 4.

Preferably, the plasma may be generated by using an electrolysis process or by using time varying electromagnetic wave. One measure of forming a plasma in the medium is an oxidation reduction potential (ORP) of the medium. If the ORP moves to the negative direction by, for example, −100 mV to −500 mV, it indicates that the medium is reductive and contains excess electrons, suggesting that the plasma generates in the medium and suitable for reduction reaction.

The electrolysis process is carried out in an electrolytic cell containing at least one anode and at least one cathode by selectively controlling production rates of negative and positive ions at the anode and the cathode so as to remove the positive ions and leave electrons in the medium. The production rates of negative and positive ions may be selectively controlled according to materials, surface conditions, current densities and potentials of the anode and the cathode.

For the purpose of facilitating the generation of the plasma, the anode and cathode is separated by physical separation, for example using polypropylene (PP) or polyethylene (PE) filter clothes or other porous mechanical separators, which can physically slow down the movement of electrons and ions. Another method for facilitating the generation of the plasma is to jet strong water stream from bottom to top to move the medium mass in upward direction in order to quickly liberate hydrogen produced at the cathode and leave electrons in the medium.

The time varying electromagnetic wave for generating the plasma has usually a frequency ranging from 0.5 kHz to 500 kHz.

To enhance the removal of the gas, it is advantageous that the plasma is subject to time varying electromagnetic wave treatment before the impingement takes place.

Another aspect of the invention is to provide a system for removing gas components $SO_x$, $NO_x$, and $CO_2$ from a flue gas, comprising:

a tower comprising:

a first stage for removing $SO_x$, including a first inlet for introducing a first liquid medium which provides a first plasma containing reactive electrons or ions, and means for spraying the first liquid medium down to form a film of the first medium across a cross section of the first stage such that the flue gas passing upward and through the first stage contacts with the film of the first liquid medium, a second stage for removing $CO_2$, including a second inlet for introducing a second liquid medium which provides a second plasma containing reactive electrons or ions, and means for spraying the second liquid medium down to form a film of the second medium across a cross section of the second stage such that the flue gas coming out from the first stage contacts with the film of the second liquid medium, and a third stage for removing $NO_x$, including a third inlet for introducing a third liquid medium which provides a third plasma containing reactive electrons or ions, and means for spraying the third liquid medium down to form a film of the third medium across a cross section of the third stage such that the flue gas coming out from the second stage contacts with the film of the third liquid medium, an electron generation system comprising:
- a first electron generation unit for generating the first plasma in the first liquid medium,
- a second electron generation unit for generating the second plasma in the second liquid medium, and
- a third electron generation unit for generating the third plasma in the third liquid medium.

According to the invention, each of the spraying means is a type of screen of spiral nozzles which is beneficial to the formation of the thin film of the medium in contact with the flue gas.

In another embodiment of the invention, a spacer is provided between the first and second stages to prevent the first stage from infiltration or interference of the second liquid medium.

The first, second and third electron generation units may be arranged outside the tower or inside the respective stages of the tower. When the electron generation units are arranged inside the tower, the plasma is in contact with the gas immediately after the plasma is created and no external generation tank is required, therefore, the energy and space required is very small and there is no additional treatment of the medium outside the tower.

Preferably, an extraction fan is mounted and/or streamline interior structure is devised inside each of the first, second and third stages of the tower to reduce the backpressure of the stage. Also, in each of the stages, drainage channels are provided on walls of the stage for draining the medium when hitting the walls.

According to the invention, the system may be provided in the form of a closed loop system or constructed as an open loop system. The term "closed loop system" herein refers to a system in which the medium is recycled to receive the re-treatment and re-circulated continuously. The term "open loop system" herein refers to a system in which the medium is discharged after contacting with the flue gas.

In contrast to the processes and systems available in the prior art, the method and the system of the invention are capable of removing all the three gases simultaneously, which significantly reduces the capital cost and requires very low energy. Moreover, the final products obtained from the invention are environmentally friendly and would not affect the ecological system, and there is no need for disposal of final products.

The most advantage of the method of the invention is that a liquid medium is utilized for the production of the necessary electrons or ions to enable the dissociation of the gas components, while the medium itself acts as an electron carrier only and does not take part in the reaction. This avoids the consumption of high energy and high voltage as done in the dry-plasma methods available in the prior art. The method of the invention may be termed "wet plasma method" to distinguish from the dry plasma method in the art.

The tower of the system of the invention is structurally different from the conventional scrubbers. Usually the conventional scrubbers are constructed to have a column as high as possible to provide a long travel path, with fine mist nozzles to provide the maximum contact surface between the medium and the flue gas. Contrary to the conventional scrubbers, the tower of the invention is configured to shorten the travel path, and takes advantage of a thin film of the medium across the cross-section of the tower to react with the flue gas. With this thin film of the medium, the contact time between the medium and the flue gas would be drastically reduced and the tower would be as short as less than 1 meter in height.

The objects, characteristics, advantages and technical effects of the invention will be further elaborated in the following description of the concepts and structures of the invention with reference to the accompanying drawings. The drawings illustrate the invention by way of examples without limitation to the invention in any manner.

DETAILED DESCRIPTION OF THE INVENTION

Figure 1:
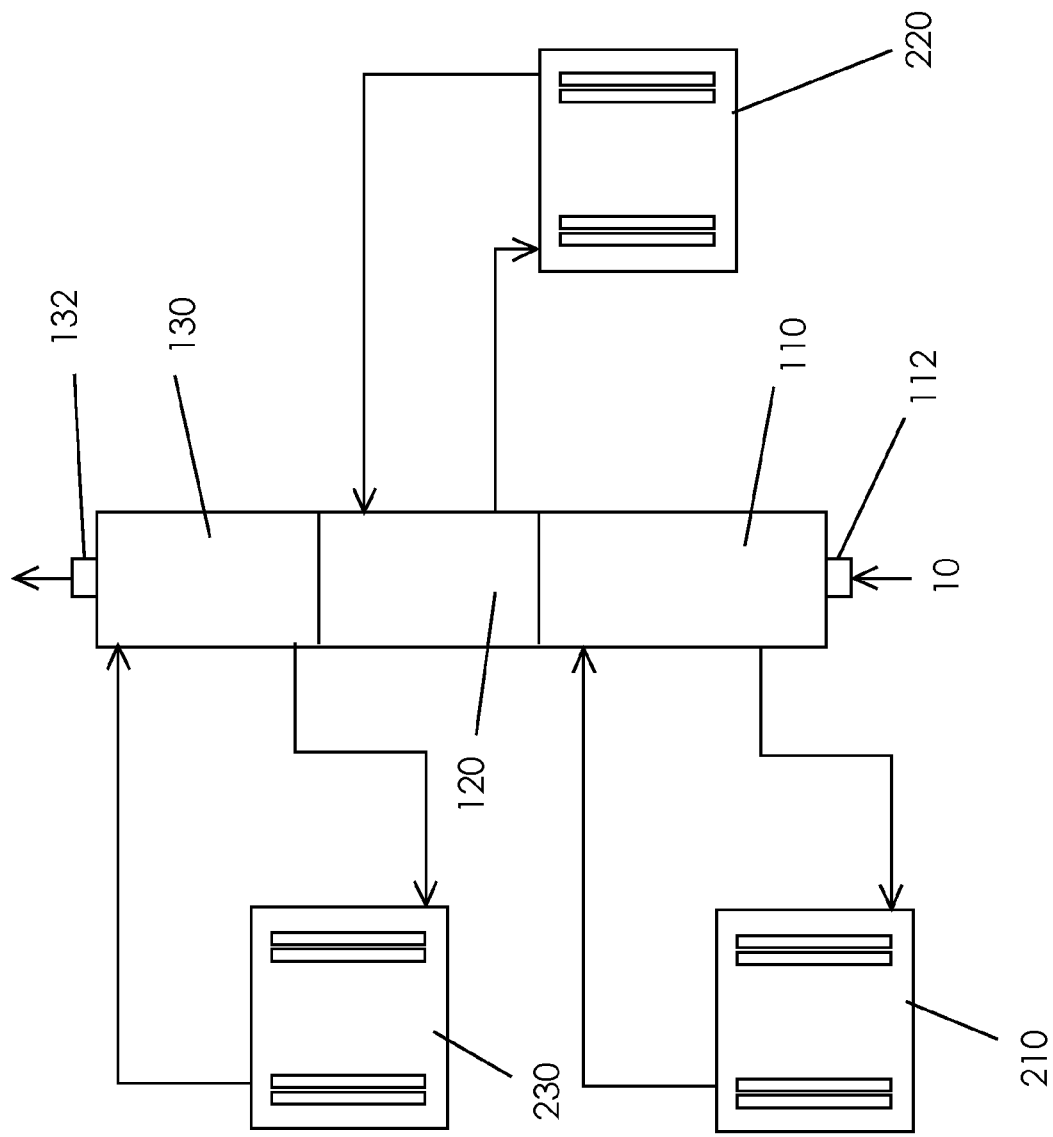
FIG. 1 is a schematic diagram showing a system for removing the gas components from the flue gas constructed in accordance with a first embodiment of the invention, wherein the electron generation units are arranged outside the tower.

The following description presents preferred embodiments. This description is not to be taken in a limiting sense but is made merely for the purpose of describing the general principles of the invention, the scope of which is further understood by the appended claims.

While this invention is illustrated and described in preferred embodiments, the invention may be produced in many different configurations, sizes, forms and materials.

It is understood that although the terms first, second, third etc. may be used herein to describe various elements, components, features and/or sections, they should not be limited by these terms. These terms are only used to distinguish one element, component, feature or section from another. Thus, a first element, component, feature or section discussed below could be termed a second element, component, feature or section without departing from the teachings of the present invention.

It has been already known that in the conventional processes, liquid phase reaction are carried out to remove the gas components from the flue gas, but the reactants to be used as well as the products and waste water disposal issues follow the removal of the gas components. To avoid these issues, the dry plasma processes are used, which however requires high energy and high voltage to bombard the gas molecules. The method of the invention utilizes a liquid medium to produce electrons or ions necessary for subjecting the gas molecules to impingement or bombarding of the electrons or ions in the gas phase as in the dry plasma processes, but the electrons or ions are produced in the liquid medium at relatively low energy and relatively low voltage.

According to the invention, the electrons or ions can be produced in the liquid medium by using electrolysis of the liquid medium. In the conventional electrolysis process, the positive and negative ions are balanced in the electrolyte and there is no excess electron stream produced. In order to produce the excess electrons or ions, the selective controlling of the production rates of the positive ions or the negative ions at the cathodes or the anodes is needed by, for example, controlling the materials, surface conditions, current density, potentials of the electrodes, such that the positive ions such as $H^+$ ions are removed from the cathode, with the result that the liquid medium is left with excess of electrons. A measure for determining the excess electrons is oxidation reduction potential (ORP) of the liquid medium, i.e. the electrolyte. If the ORP moves to the negative direction, it indicates that the electrolyte is reductive and contains excess electrons. Such an electrolyte is now an electrons carrier and can be used in the method of the invention.

Another approach to produce the electrons or ions in the liquid medium is to use time varying electromagnetic wave. By controlling the frequency of the time varying electromagnetic wave within a selected range, the ORP of the liquid medium can be shifted to the negative direction, which is desirable to be used in the method of the invention. An advantage of using time varying electromagnetic wave is that undesirable products induced by electrolyzing the liquid medium, for example chlorine gas when seawater is used as the liquid medium, can be eliminated.

When the liquid medium with excess of electrons contacts with the flue gas containing the gas molecules $SO_x$, $NO_x$ and $CO_2$, the gas molecules would be impinged by the highly reactive electron streams, and therefore, the chemical bonds of the gas molecules are subject to vibrations and excitation to permit the dissociation of the gas molecules into atoms, elements, sub-elements, electrons, ions, free radicals, energy and the like. It has been found that an increased amount of oxygen as well as a trace amount of CO, C and $N_2$ is detected and measured. This impingement is similar to the case of the dry plasma which requires much higher energy.

Since the liquid medium is used to provide the plasma containing the electrons or ions in the method of the invention, it is likely that the liquid phase reaction between the gas components in the flue gas and the liquid medium and the gas phase reaction between the gas components in the flue gas and the electrons carried by the liquid medium take place simultaneously. Hence, measures need to be taken to prevent the liquid phase reaction in order to ensure the gas phase reaction to proceed. It has been surprisingly found that if the liquid medium is a buffer solution, any acid produced by the $SO_x$, $NO_x$ or $CO_2$ with the liquid medium will be neutralized by the buffer in the solution. As such the rate for the gas to enter the solution will be slowed down by the buffering reaction, and it becomes easier for the gases to go for the gas phase reaction in which the gas molecules are subject to the impingement of the electrons, so that the gas molecules are broken up to their respective elemental or sub-elemental forms. As the buffering compounds are continuously consumed, it is necessary to constantly replenish the electron supply so as to make up for the consumption of the electrons. For this reason, the method of the invention may undergo in a closed loop system in which the liquid medium is constantly recharged by either electrolysis or time varying electromagnetic wave process to maintain the electron supply. When the system is undergoing a pure gas phase reaction, the chemical properties including pH, conductivity, alkalinity of the liquid medium remain unchanged.

For the buffering solution to sustain the buffering properties, it is important that the buffer solution must be operated under the condition that the ionization constant pKa of the solution is equal to or close to its pH value, which means that the solution is operating at its maximum buffering condition.

There are many aqueous buffer ionic solutions used as the liquid medium. These buffer solutions may be used individually or any combination thereof. For example, seawater may be used as a medium, and it contains a mixture of many different buffers including carbonate, sulphates, phosphates and the like. The typical individual buffer solutions include but not limited to acetate, 2-amino-2-methyl-1,3-propanediol, 2-amino-2-methyl-1-propanol, amino-1-propanesulfonic acid, ammonia, arsenate, barbital, bicine, Bis-tris propane, borate, cacodylate, carbonate, citrate, L-cysteine, diethanolamine, diglycolate, 3,3-dimethylglutarate, ethanolamine, N-ethylmorpholine, glycerol 2-phosphate, glycine, glycine amide, glycylglycine, glycylglycylglycine, L-histidine, hydrazine, imidazole, maleate, 2-mercaptoethanol, methylamine, 2-methylimidazole, oxalate, phosphate, phthalate, piperazine, PIPES, POPSO, pyrophosphate, succinate, sulfate, sulfite, L-tartaric acid, tricine, triethanolamine, triethylamine.

The buffering solutions may also be grouped as inorganic acids, carboxylic acids, alcohols, oximes hydroxamic acids, peroxides, protonated species, sulfinic & sulfonic acids, protonated nitrogen, amines, amides, amides and carbamates, imides, sulfonamide, guannidinium, hydrazones, protonated heterocycles, hydroxamic acid & amidines, heterocycles, hydrocarbons, amides, ketones, nitriles, hetero-aromatics, sulfides, sulfoxides, sulfonium, sulfimides & sulfoximnes, sulfones, ethers, selenides, ammonium, phosphonium, phosponates & phosphine oxides, phosphine oxides, imines.

Since the flue gas contains a mixture of the gas components $SO_x$, $CO_2$ and $NO_x$, there will be competing reactions between these three gases. By selectively controlling the pH value, the ionic properties of the liquid medium, and the contact temperature between the liquid medium and the flue gas, the gas components would be abated respectively.

According to the method of the invention, the gas components $SO_x$, $CO_2$ and $NO_x$ may be removed in one pass through three different stages of a tower. Referring now to the drawings, FIG. 1 illustrates a system constructed consistent with a first embodiment of the present invention. In this embodiment, the system is has a tower, and an electron generation system comprising a first electron generation unit 210, a second electron generation unit 220 and a third electron generation unit 230. These electron generation units are arranged outside the tower and connected with the tower through pipelines.

As shown in FIG. 1, the tower is configured to include a first stage 110 located at its bottom, a second stage 120 above the first stage 110 and a third stage 130 above the second stage 120. A flue gas 10 enters the first stage 110 via a first inlet 112 located at the bottom of the reactor 10 and passes upward and through the second stage 120 and the third stage 130 to exit via an gas outlet 132 on the top of the tower. The electron generation units 210, 220, and 230 provide respective electron streams for the three different stages 110, 120 and 130.

In the first stage 110, the alkaline or acidic medium carrying the excess electrons may be use to provide the electrons and ions. One example of the alkaline medium is freshwater saturated with $MgCO_3$ at the pH of 9 to 11. It is critical that the pH value of the $MgCO_3$ solution is maintained at the range of 9 to 11, which is equal to the pKa value of $MgCO_3$ in water. This ensures that the $MgCO_3$ solution is operating at its maximum buffering condition. Under the maximum buffering condition, the liquid phase reaction between the $SO_2$ in the flue gas and the $MgCO_3$ solution would be suppressed because the $SO_2$ first needs to react with water to give $SO_4^{2+}$ and $H^+$, the $H^+$ is then neutralized by the buffer solution to complete the liquid phase reaction. If the $MgCO_3$ solution does not have the excess electrons, such a liquid phase reaction will take place, though the liquid phase reaction process is very much slowed down due to the buffering effect. However, when the $MgCO_3$ solution has an excess of electrons, these electrons would compete with the liquid phase reaction to react with $SO_2$. As such, the gas $SO_2$ would take the easier route to go for the gas phase reaction. In the gas phase reaction, the SO2 molecules are subject to the impingement of the highly reductive electrons to convert into oxygen gas and elemental substance S.

The highly reductive medium has −100−−500 mV ORP before the gas phase reaction takes place to remove the gas $SO_x$. After the removal of the gas $SO_x$, the ORP of the medium will move back to the positive direction. However, the pH remains constant as no $H^+$ is produced by any liquid phase reaction. No neutralization process is required in the invention and no additional sulfate is produced in the $MgCO_3$ solution. More importantly, the freshwater with $MgCO_3$ is selected for its property of selective removal of $SO_x$ over other gases. Since the ORP moves to the positive direction after the $SO_x$ removal, the $MgCO_3$ solution is returned back into the first electron generation unit 210 to be regenerated to regain the negative ORP. In the regeneration process, the pH value remains to be more or less constant with minimum fluctuations. Conductivity and other water parameters also remain to be more or less constant. This is also an indicator to show the $SO_x$ removal is undergoing a full gas phase reaction.

The removal of the gas $SO_x$ is sensitive to the composition of the liquid medium. In some cases, certain strong ionic elements should be avoided in the solution. Otherwise the liquid phase reaction may overtake the gas phase reaction, and the liquid medium cannot be regenerated. Therefore, a spacer is provided between the first stage 110 and the second stage 120 to avoid the infiltration or interference of NaCl contained in seawater or other strong ionic solutions from the second stage 120.

There are other aqueous buffer ionic solutions which may be used as the first liquid medium. For example, seawater, which contains a mixture of many different buffers including carbonate, sulphates, phosphates, may be used as the first liquid medium, as long as the solution is operating at the pH close to or equal to the pKa of the solution. As discussed above, when the buffering condition is maintained, it becomes easier for the $SO_x$ to undergo the gas phase reactions instead of the liquid phase reaction.

Alternatively, the acidic medium may be used in the first stage 110. One example of the acidic medium is sulfuric acid solution at the pH of 2 to 4. Using the acidic medium is advantageous especially when there is a sudden surge in $SO_2$ gas load beyond the normal anticipated amount. If the alkaline based buffer solution is used, the excessive load of $SO_2$ may break the buffer if the supply of electrons is insufficient; and if this happens, the $SO_2$ will enter into the solution and cause the buffer solution to become acidic, hence loses its buffering capability. When the sulfuric acid buffer solution is used, the buffer solution can maintain its buffering capability well enough even if the $SO_2$ load is excessive. Of course, consideration of the issue of corrosion of the material for making the tower or the first electron generation unit 210 needs to be taken, in the case of the use of the acidic medium.

Figure 3:
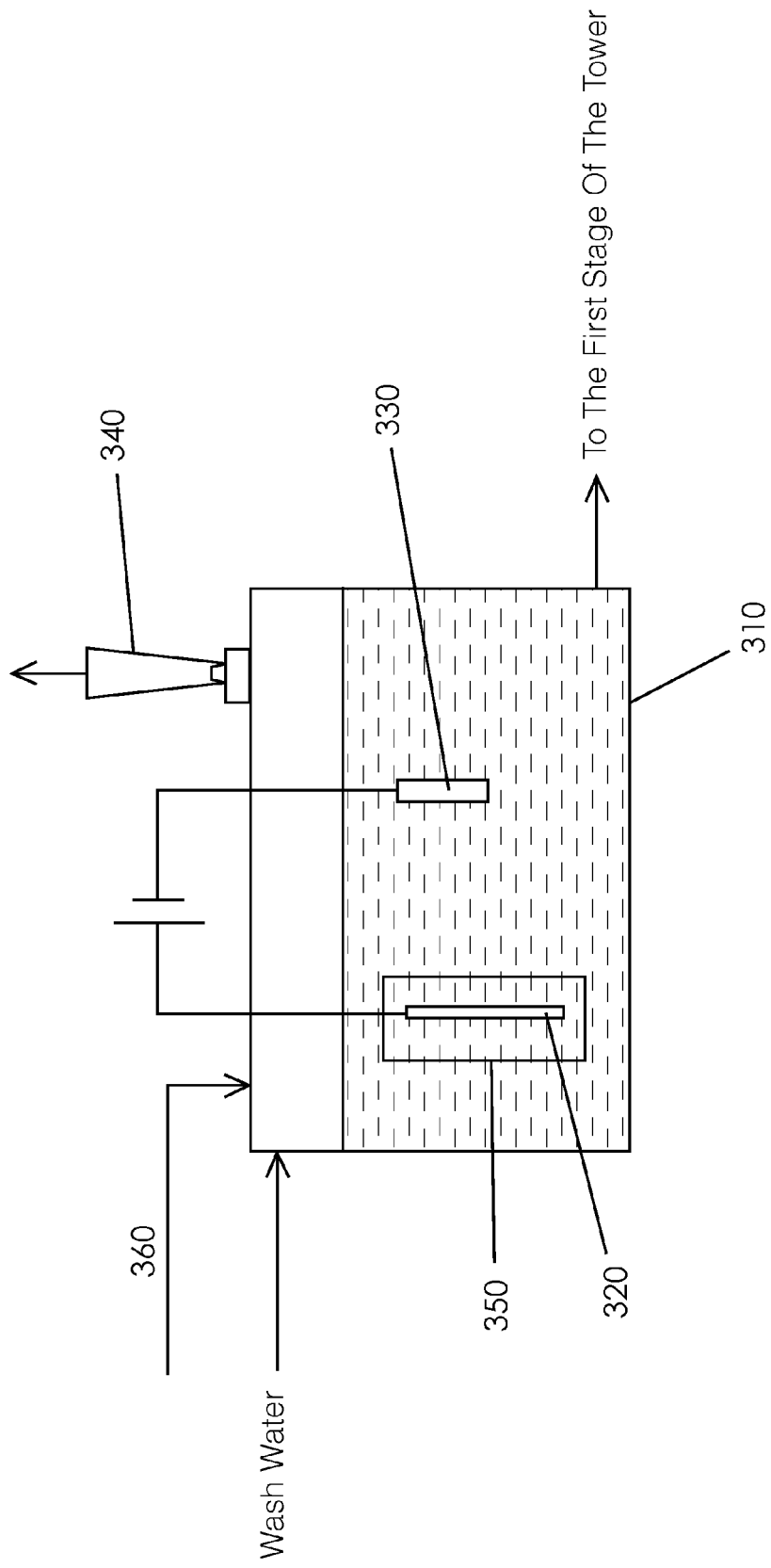
FIG. 3 is a schematic diagram showing an electron generation unit utilizing electrolysis.

The electrons are generated in the first electron generation unit 210 by either electrolyzing the $MgCO_3$ solution or applying time varying electromagnetic wave to the $MgCO_3$ solution. FIG. 3 illustrates a schematic diagram of the electron generation unit utilizing electrolysis. As illustrated, the electron generation unit comprises an electrolytic cell 310, an anode 320 and a cathode 330 which are positioned in a spaced-apart relation. The anode 320 may be made of inert or semi-consumable materials, such as metals, metal oxides, graphite, silicon iron, platinized titanium and niobium materials. The cathode may be made of metal materials or graphite, typically nickel, steel, nickel plated steel, copper, metal oxide and the like. The anode and the cathode are separated by membrane, ionic membrane or physical separation. Preferably, the physical separation is realized by polypropylene (PP) or polyethylene (PE) filter clothes. Use of the physical separation can physically slow down movement of the ions in the electrolytic cell, which is sufficient to produce the desirable effect. With this mechanical PP or PE filter separator, the issues induced by the use of a membrane between the electrodes are eliminated. In the electrolytic cell, the electrolyte will become very acidic at the anode side and become alkaline at the cathode side in the electrolysis process. In such very acidic and alkaline environments, the membrane is vulnerable, and the handling of these acid and alkaline solutions is an issue. In the invention, the anode is wrapped with a PP or PE bag 350 to separate the anode from the cathode. There is no production of acidic water and the entire electrolyte is alkaline when the $MgCO_3$ solution is electrolyzed.

In this embodiment, freshwater is used as the liquid medium and subject to the electrolysis. Therefore, no chlorine gas would be generated during the electrolysis process. According to the invention, it is critical that the $H^+$ ions must be removed from the water at the cathode to produce and dissipate hydrogen gas as quickly as possible, in order to create excess electrons in the water. The removal of the $H^+$ ions may be affected by controlling the depth of immersion of the electrodes, the positioning, direction, shape, size, surface conditions and materials of the electrodes. Water flow condition also affects the rate of hydrogen liberation. Another method to assist the liberation of hydrogen is to jet strong water stream from bottom to top to move the water in upward direction. A propeller stirrer or strong air lift provision may be provided in the electrolytic cell 310 to lift the hydrogen off the surface of cathode.

The hydrogen gas is sensitive to the water head and to the suction position of the electrolyte delivery pipe in the electrolytic cell. The electrolytic cell is therefore designed to draw the electrolyte for spraying at such a position that the hydrogen gas liberation at the electrode surface is promoted. Typically the electrolyte pipe suctions are arranged at a position close to the cathode.

The material of the electrolytic cell is also critical. The material is selected such that no electron is drained off. The material is preferably a nonmetallic material. If a metallic material is required to meet the structure strength requirement, the electrolytic cell must be lined or coated with a non conductive material such as epoxy, fiber glass, PVC or rubber.

When the oxidation reduction potential (ORP) is moved in the negative volt direction by −100 to −500 mV, it indicates that the excess electrons or imbalance of electrons are presented in the electrolyte, so the electrolyte carries the necessary reductive electrons to perform the gas phase reaction.

Since hydrogen gas is produced, the safety issue should be considered. For this reason, a compressed air lift venturi 340 is mounted on the top of the electrolytic cell to remove quickly the hydrogen from the electrolytic cell 310. At the same time, fresh air 360 is introduced into the electrolytic cell 310 to control the concentration of the hydrogen so as not to exceed the hydrogen concentration safety limit of 4% volumetric concentration.

Figure 4:
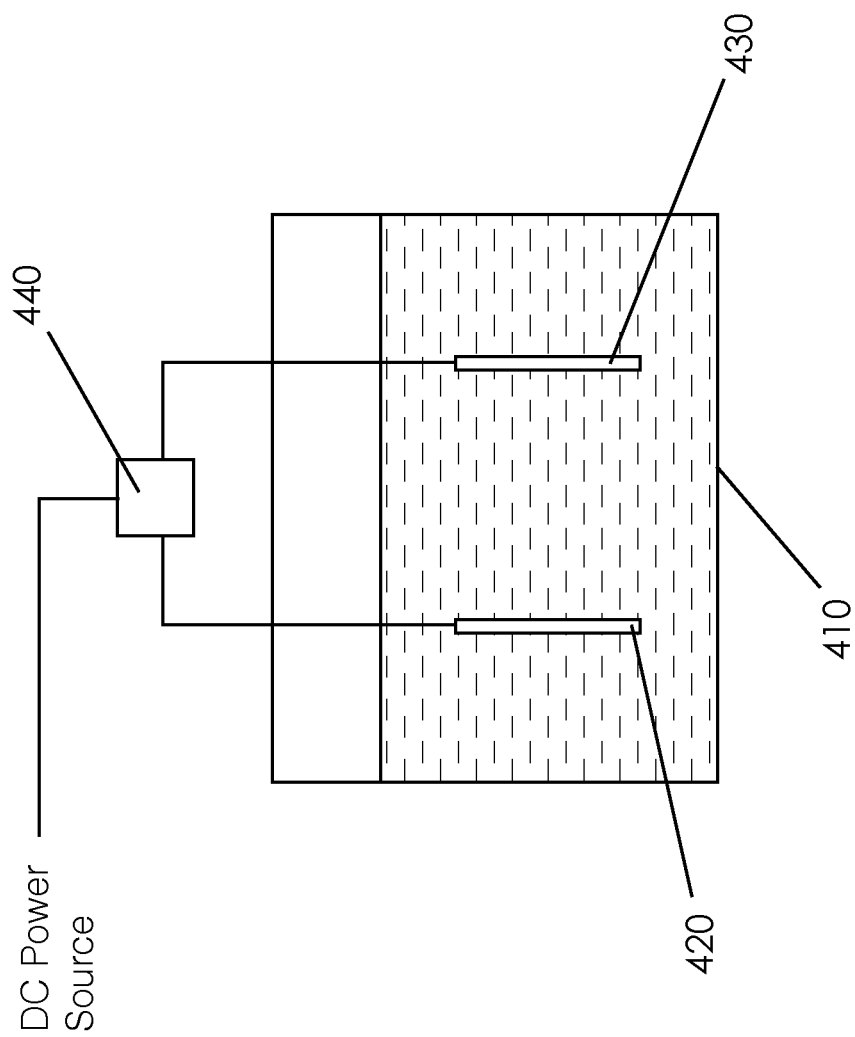
FIG. 4 is a schematic diagram showing an electron generation unit utilizing time varying electromagnetic wave.

FIG. 4 illustrates a schematic diagram of the electron generation unit utilizing time varying electromagnetic wave. As illustrated, the electron generation unit comprises a tank 410, and two spaced electrode antennas 420, 430 submerged in the $MgCO_3$ aqueous solution. The electron generation unit further comprises an electromagnetic wave generation card 440 connected in series between the two electrode antennas 420, 430, and a DC power source coupled with the electromagnetic wave generation card 440. The electromagnetic wave generation card 440 has a variety of ranges of frequency, which all fall into the scope of desirable frequencies. In this embodiment, the desirable frequencies are in the range of 0.5 kHz to 500 kHz with a time varying range in the order from micro seconds to seconds, preferably in the range of 0.5 kHz to 1 kHz, particularly in the order of 5 kHz, 10 kHz, 20 kHz.

The electrode antennas 420, 430 are disposed in the $MgCO_3$ solution in a spaced apart relation, allowing to subject the $MgCO_3$ solution to the electromagnetic wave extensively. Advantageously, the electrode antennas 420, 430 are spaced apart such that they are operating with the frequencies to achieve the best coverage. The electromagnetic wave form may be in square wave, sine wave, saw tooth wave, triangular wave or the like. The electrode antennas may be made of a material selected from metals such as magnesium, barium, steel, copper, metal oxides such as iridium oxides, ruthenium oxides or a mixture thereof, graphite or other conductive metals. The shape of the electrodes may be varied according to the actual installation requirements, and may be in rod, strip, bars, disc and other geometrical shapes. With the different electrode shape, the voltage required to drive the electrodes will be varied to maintain the minimum current required to perform the electron generation in the electrolyte.

When the ORP of the $MgCO_3$ solution is shifted to the negative direction by 100 mV to 500 mV, it indicates that the $MgCO_3$ solution carries excess electrons and is suitable for the gas phase reaction in the wet plasma condition. Such $MgCO_3$ solution is pumped into the top of the first stage 110 and sprayed downward. The $MgCO_3$ solution is sprayed through a type of screen of spiral nozzles (not shown in FIG. 1). The arrangement of proper size of the spiral nozzles and proper size of the first stage would lead to a correct nozzle pressure, under which a thin film of the $MgCO_3$ solution is formed across the cross section of the first stage 110. Although the film is very thin, it is sufficient to provide the contact time between the flue gas and the electrons to react in the gas phase, because the reaction between the gas and the electrons takes place very fast. The thin film completely blocks the cross section of the first stage, such that the flue gas rising upward from the bottom of the first stage 110 is forced to come into contact with this thin film of the $MgCO_3$ solution, i.e. with the electrons carried in the $MgCO_3$ solution. In this way, the gas $SO_x$ is subject to the impingement of the electrons to be dissociated.

It is understood that the conventional scrubbers are designed to have fine mist nozzles and to be long vertically in order to provide maximum contact surface and maximum contact time between the flue gas and the medium. Contrary to the conventional scrubbers, the tower of the invention avoids the use of fine mist nozzles since a number of gas escape paths are found between the mists, which would affect the efficacy of the gas phase reaction. Therefore, the type of screen of spiral nozzles, such as spray screen and mist screen, is properly used in the invention to form the film blocking the cross section of the tower.

It is surprisingly observed that the $MgCO_3$ solution carrying the excess electrons, after being subjected to a treatment of time varying low frequency electromagnetic field, would greatly increase the removal of $SO_x$. Therefore, means (not shown) for generating an electromagnetic field which has a varying low frequency is arranged before the $MgCO_3$ solution is introduced and sprayed down into the first stage 110. For example, the means consists of a coil wrapped around a piece of pipe to apply a time varying low frequency electromagnetic field to the $MgCO_3$ solution flowing through the pipe. Or the electrode antennas may be placed in the pipe through which the $MgCO_3$ solution flows into the first stage. The energized $MgCO_3$ solution is then sprayed to form the thin film so as to contact with the flue gas rising upward from the first stage 110. In the means for generating an electromagnetic field, the current flowing through the coil or the electrode antennas and the frequency range can be controlled or pre-programmed to suit the properties of the gas to be specifically removed.

In order to further enhance the removal of the $SO_x$, drainage channels (not shown) are provided for immediately draining the $MgCO_3$ solution once the solution hits the walls of the first stage. This would prevent the solution from flowing down along the walls to provide the long contact time and the large contact surface. As discussed above, the long contact time and the large contact surface between the gas and the solution should be avoided as possible for the gas phase reaction in the invention.

The second stage 120 is configured to remove $CO_2$ from the flue gas. Practically, all $SO_x$ would be substantially completely removed in the first stage 110. Therefore, the flue gas coming out from the first stage generally comprises the gas components $CO_2$ and $NO_x$. Likewise, the principle that the pKa of the liquid medium is equal to or close to the pH value of the liquid medium is applicable to the second stage 120. There are numerous solutions that have the ability to remove the $CO_2$ as long as the pKa and the pH value are appropriately selected. For example, seawater with or without the addition of $MgCO_3$ can give very good result of $CO_2$ removal through the gas phase reaction. In addition, fresh water with the $MgCO_3$ under the condition that the pKa is equal to the pH value may be used as a medium to perform the $CO_2$ removal. In this embodiment, seawater saturated with $MgCO_3$ at the pH ranging from 9 to 11 is used as the second liquid medium to generate the second plasma providing the excess electrons.

In the second stage 120, the gas $CO_2$ is found to be reduced drastically with the generation of fine carbon particles and oxygen as well as a trace amount of CO.

The second stage 120 is structurally same as the first stage 110 and will not be elaborated herein. Like the first electron generation unit 210, the second electron generation unit 220 providing the necessary electrons for the second stage can be the type of electrolysis or the type of time varying electromagnetic wave.

A large portion of $CO_2$ has been removed in the second stage 120. So the flue gas entering into the third stage contains mainly the $NO_x$ and a very small amount of $CO_2$.

The third stage 130 is configured to remove $NO_x$. Since the gas components $SO_x$ and $CO_2$ have been substantially removed from the flue gas, the electron loading supplied to the third stage is reduced. In this stage, the liquid medium is preferably to have a very high pH value in order to create the environment suitable for the gas phase reduction of $NO_x$. Preferably, either freshwater or seawater saturated with $MgCO_3$ at the pH ranging from 10 to 12 may be used for the conversion of $NO_x$ into the gases $N_2$ and $O_2$.

The third stage 130 and the third electron generation unit 230 for providing the electron stream to the third stage are structurally same as the first stage 110 and the first electron generation unit 210, which will not be elaborated herein.

Turning back to FIG. 1, it is illustrated a closed loop system for removing the gas components from the flue gas. As can be seen, in each of the stages of the tower, the water after contacting with the gas (referred to "wash water" herein) is re-circulated back to the electron generation unit as a source of the liquid medium to regenerate the plasma containing the necessary electrons, as long as the pH of the wash water is energized to be equal to or close to the pKa of the $MgCO_3$ solution. In the closed loop system, the quantity of liquid medium required is less relatively.

The method of the invention can also be implemented in an open loop system. In the open loop system, the liquid medium is energized once by the electrolysis or by the time varying electromagnetic wave to achieve the pKa=pH condition, and then sprayed into the tower for the gas removal. The wash water is then discharged directly, since the discharge water of the invention would not affect the ecological system and satisfies the discharge requirements. Of course, any combination of open loop and closed loop systems for the three stages is possible depending on the actual application requirements and the availability of the liquid medium.

Figure 2:
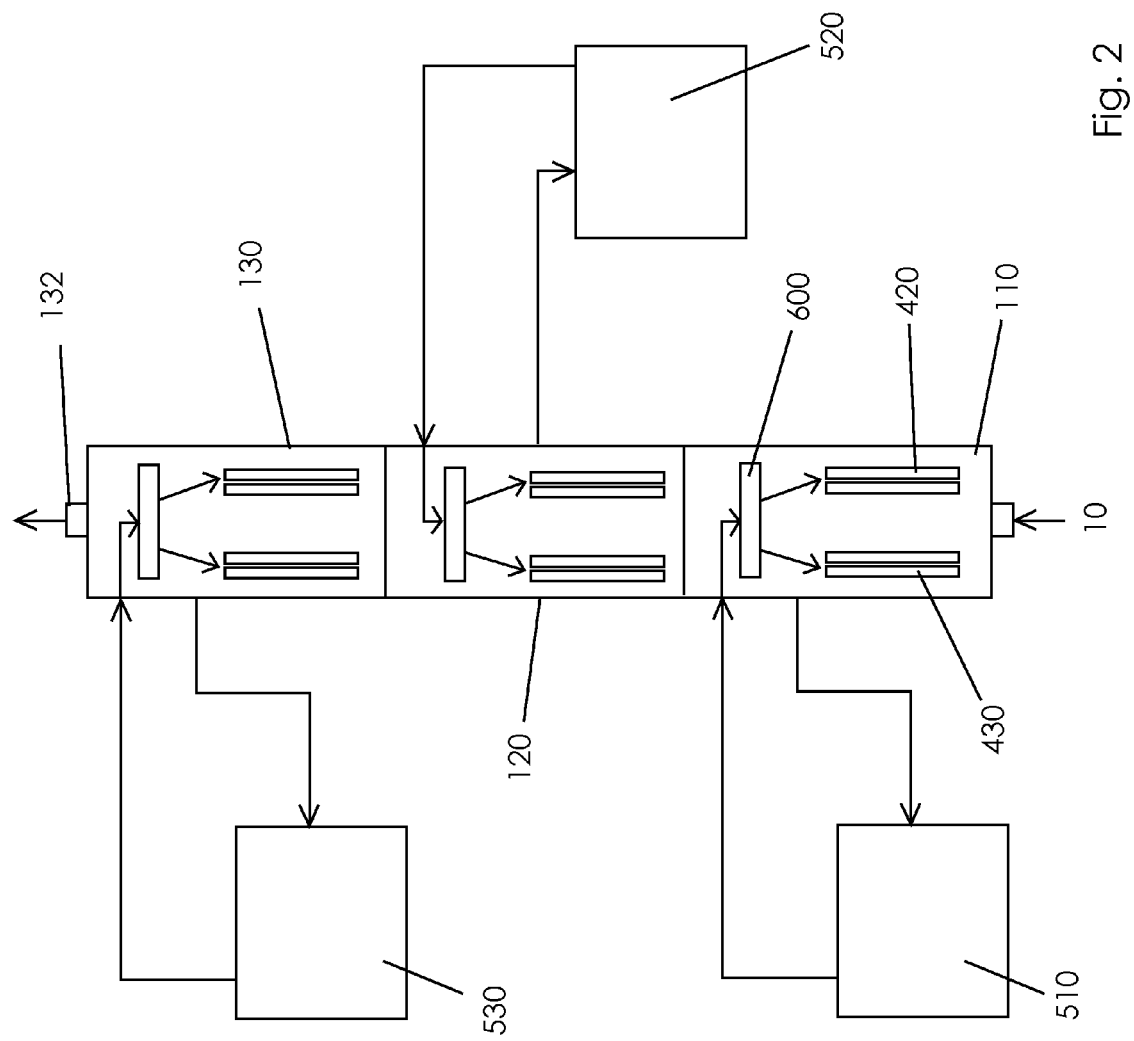
FIG. 2 is a schematic diagram showing a system for removing the gas components from the flue gas constructed in accordance with a second embodiment of the invention, wherein the electron generation units are arranged inside the tower.

FIG. 2 illustrates a system for removing the gas components from the flue gas constructed in accordance with a second embodiment of the invention. This system is substantially same as the one disclosed in the first embodiment, but differs in that the electron generation units are arranged inside the respective stages of the tower. In this embodiment, the system is also a type of closed loop system.

As shown in FIG. 2, wash water tanks 510, 520, 530 for the three respective stages 110, 120, 130 of the tower is arranged outside the tower, and the electron generation units are securely attached to the walls of the tower in a manner well known in the art. Taking the first stage 110 as an example, the electron generation unit comprises at least two electrode antennas 420 and 430 oppositely secured onto the walls of the first stage. The $MgCO_3$ solution from the wash water tank 510 is fed into the top of the first stage 110 and sprayed down through the screen of spiral nozzles 600 and through the space defined by the electrode antennas 420 and 430 to form the film across the cross section of the stage. If the electrode antennas are properly selected and arranged, the plasma containing excess electrons or ions would be created to perform the gas phase reaction as discussed above. After contacting the flue gas, the wash water is discharged to the wash water tank 510 to be re-generated.

The arrangement of the electron generation units inside the tower would save much energy and space compared with the system described in the first embodiment above. This is because the liquid medium is energized to create the plasma within the tower, and therefore the external facilities are eliminated. Another advantage of such an arrangement is that the plasma can be in contact with the flue gas immediately with minimum loss of energy. Because of these characteristics, even a thin film of the liquid medium has the capability of producing the desired effect of removing the gas components from the flue gas.

As described above, it is not necessary for the tower of the invention to provide a long travel path, therefore, the tower of the invention can be constructed to be very compact, enabling to force all gas components into a very confined space to provide the best gas phase reaction contact and reactions. In addition, an extraction fan may be mounted or streamline interior structures may be provided inside each of the stages of the tower to reduce the backpressure.

The method of the invention has been tested to treat the flue gas under the conditions below:

Stages of the tower: the first stage—closed loop, freshwater with $MgCO_3$ at the pH of 9 to 11
   the second stage—open loop, seawater at the pH of 9 to 11
   the third stage—open loop, freshwater with $MgCO_3$ at the pH of 10 to 12

Electron generation units: the type of time varying electromagnetic wave produced by a spike card having a frequency of 66.67 Hz and aluminum/magnesium electrode antennas The results of the tests showed that the removal of the gas $SO_x$, $NO_x$ and $CO_2$ are 45%-70%, 40%-50% and 10%-25%, respectively.

Thus, the present invention provides a method and a system which effectively remove the gas components $SO_x$, $NO_x$ and $CO_2$ from a flue gas. The invention is significantly more economical and convenient and does not cause harm to the environments. When compared with the processes and systems in the prior art, the invention exhibits a novel and unique feature that a liquid medium is utilized for the production of the necessary electrons or ions to enable the dissociation of the gas components in the wet plasma environment, while the medium itself acts as an electron carrier only and does not take part in the reaction. This avoids the consumption of high energy and high voltage.

In contrast to the processes and systems available in the prior art, the method and the system of the invention are capable of removing all the three gases simultaneously by using very low energy at reduced capital cost. Moreover, the final products obtained from the invention are environmentally friendly and would not affect the ecological system, and there is no need for disposal of final products.

Having sufficiently described the nature of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A method for removing gas components $SO_x$, $NO_x$, and $CO_2$ from a flue gas, comprising the steps of: a) contacting the flue gas with a first liquid medium which provides a first plasma containing reactive electrons or ions in an amount such that the gas molecules $SO_x$ are subject to impingement of the electrons or ions in the first plasma to enable the dissociation of the gas molecules $SO_x$, so as to remove $SO_x$ from the flue gas; b) contacting the flue gas obtained from step a) with a second liquid medium which provides a second plasma containing reactive electrons or ions in an amount such that the gas molecules $CO_2$ are subject to impingement of the electrons or ions in the second plasma to enable the dissociation of the gas molecules $CO_2$ so as to remove $CO_2$ from the flue gas; and c) contacting the flue gas obtained from step b) with a third liquid medium which provides a third plasma containing reactive electrons or ions in an amount such that the gas molecules $NO_x$ are subject to impingement of the electrons or ions in the third plasma to enable the dissociation of the gas molecules $NO_x$ so as to remove $NO_x$ from the flue gas.

2. The method according to claim 1, wherein the first, second and third liquid media have pH value substantially equal to or close to their respective ionization constant (pKa).

3. The method according to claim 1, wherein the first medium is fresh water saturated with carbonates, sulphates, phosphates or any combination thereof with a pH ranging from 9 to 11.

4. The method according to claim 1, wherein the first medium is sulfuric acid solution at a pH ranging from 2 to 4.

5. The method according to claim 1, wherein the second medium is fresh water or sea water saturated with carbonates, sulphates, phosphates or any combination thereof at a pH ranging from 9 to 13.

6. The method according to claim 1, wherein the third medium is fresh water or sea water saturated with carbonates, sulphates, phosphates or any combination thereof at a pH ranging from 10 to 12.

7. The method according to claim 1, wherein the first, second and third plasmas are generated by electrolyzing the first, second and third liquid media in an electrolytic cell containing at least one anode and at least one cathode, respectively, the electrolyzing is implemented by selectively controlling production rates of negative and positive ions at the anode and the cathode so as to remove the positive ions and leave the electrons or reactive ions in the media.

8. The method according to claim 7, wherein the anode is made of a material selected from the group consisting of metals, metal oxides, graphite, and platinized titanium.

9. The method according to claim 7, wherein the cathode is made of a material selected from the group consisting of nickel, steel, nickel plated steel, copper, graphite, and metal oxide.

10. The method according to claim 7, wherein the anode and cathode is separated by physical separation.

11. The method according to claim 10, wherein the physical separation is performed by polypropylene (PP) or polyethylene (PE) filter clothes or a porous mechanical separator.

12. The method according to claim 7, further comprising the step of jetting strong water stream from bottom to top to move the media mass in upward direction in order to quickly liberate hydrogen produced at the cathode.

13. The method according to claim 7, wherein the production rates of negative and positive ions are selectively controlled according to materials, surface conditions, current densities and potentials of the anode and the cathode.

14. The method according to claim 1, wherein the first, second and third plasmas are generated by applying time varying electromagnetic wave to the first, second and third media, respectively.

15. The method according to claim 14, wherein the time varying electromagnetic wave has a frequency ranging from 0.5 kHz to 500 kHz.

16. The method according to claim 1, wherein the first, second and third media are respectively collected after contacting with the flue gas, and then energized to produce the reactive electrons or ions necessary for the dissociation of the gas components so that they are re-circulated continuously.

17. The method according to claim 1, wherein in steps a) to c), the media have respective oxidation reduction potential of −100 to −500 mV.

18. The method according to claim 1, wherein in each of steps a) to c), the plasma is subject to time varying electromagnetic wave treatment before the impingement takes place.

19. A system for removing gas components $SO_x$, $NO_x$, and $CO_2$ from a flue gas, comprising: a tower comprising: a first stage for removing $SO_x$, including a first inlet for introducing a first liquid medium which provides a first plasma containing reactive electrons or ions, and means for spraying the first liquid medium down to form a film of the first medium across a cross section of the first stage such that the flue gas passing upward and through the first stage contacts with the film of the first liquid medium, a second stage for removing $CO_2$, including a second inlet for introducing a second liquid medium which provides a second plasma containing reactive electrons or ions, and means for spraying the second liquid medium down to form a film of the second medium across a cross section of the second stage such that the flue gas coming out from the first stage contacts with the film of the second liquid medium, and a third stage for removing $NO_x$, including a third inlet for introducing a third liquid medium which provides a third plasma containing reactive electrons or ions, and means for spraying the third liquid medium down to form a film of the third medium across a cross section of the third stage such that the flue gas coming out from the second stage contacts with the film of the third liquid medium, an electron generation system comprising: a first electron generation unit for generating the first plasma in the first liquid medium, a second electron generation unit for generating the second plasma in the second liquid medium, and a third electron generation unit for generating the third plasma in the third liquid medium.

20. The system according to claim 19, wherein each of the spraying means is a type of screen of spiral nozzles.

21. The system according to claim 19, wherein a spacer is provided between the first and second stages to prevent the first stage from infiltration or interference of the second liquid medium.

22. The system according to claim 19, wherein the first, second and third electron generation units are arranged outside the tower.

23. The system according to claim 19, wherein the first electron generation unit is arranged inside the first stage of the tower, the second electron generation unit is arranged inside the second stage of the tower, and the third electron generation unit is arranged inside the third stage of the tower.

24. The system according to claim 19, wherein each of the electron generation units comprises an electrolytic cell containing at least one anode and at least one cathode, across which direct current is applied for causing electrolysis of the medium in the electrolytic cell.

25. The system according to claim 24, wherein the anode is made of a material selected from the group consisting of metals, metal oxides, graphite, and platinized titanium.

26. The system according to claim 24 wherein the cathode is made of a material selected from the group consisting of nickel, steel, nickel plated steel, copper, graphite, and metal oxide.

27. The system according to claim 24, wherein the anode and cathode is physically separated by wrapping the anode with a PP or PE bag.

28. The system according to claim 24, wherein a propeller stirrer or an air lift provision is provided to lift hydrogen gas away from a surface of the cathode.

29. The system according to claim 24, wherein a compressed air lift venturi is mounted on the top of the electrolytic cell for dissipation of hydrogen gas from the electrolytic cell.

30. The system according to claim 24, wherein an inlet for feeding the medium is arranged in the electrolytic cell at a position close to the cathode.

31. The system according to claim 24, wherein the electrolytic cell is made of a nonmetallic material or a metallic material with non-conductive lining or coating.

32. The system according to claim 19, wherein each of the electron generation units comprises means for generating time varying electromagnetic wave, and the medium is subject to the time varying electromagnetic wave for the generation of the plasma.

33. The system according to claim 32, wherein the time varying electromagnetic wave has a frequency ranging from 0.5 kHz to 500 kHz.

34. The system according to claim 32, wherein the means for generating time varying electromagnetic wave comprises a tank containing at least two electrode antennas submerged in the medium in a spaced manner, an electromagnetic wave generation card connected between the two electrode antennas, and an DC power source coupled with the wave generation card.

35. The system according to claim 34, wherein the two electrode antennas are made of metals such as magnesium, barium, copper, steel, metal oxides such as iridium oxides, ruthenium oxides or a mixture thereof, or graphite.

36. The system according to claim 19, wherein another means for generating time varying electromagnetic wave is arranged to subject each of the first, second and third media to the time varying electromagnetic wave before it is introduced into the tower.

37. The system according to claim 19, wherein an extraction fan is mounted inside each of the first, second and third stages of the tower.

38. The system according to claim 19, wherein in each of the stages, drainage channels are provided on walls of the stage for draining the medium when hitting the walls.

* * * * *